May 29, 1934.  S. G. RUSSELL  1,960,285
FISHING REEL
Filed July 28, 1933
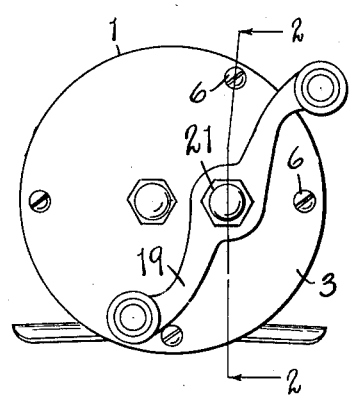
Fig. 1
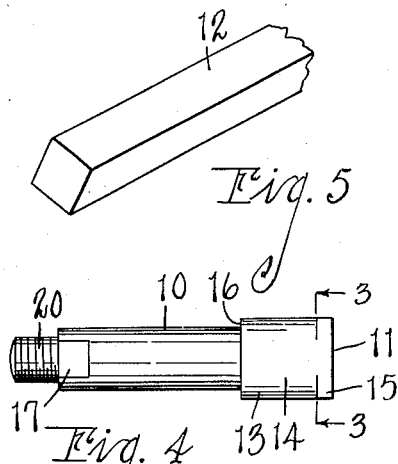
Fig. 5
Fig. 4
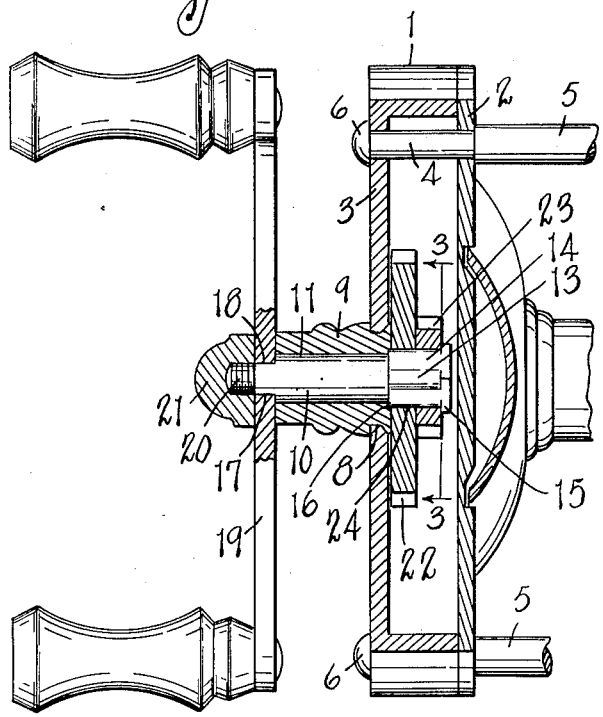
Fig. 2
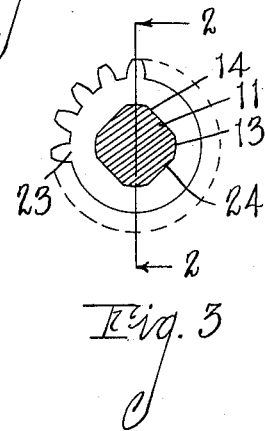
Fig. 3
INVENTOR
Samuel G. Russell
BY
Chappell & Earl
ATTORNEYS Patented May 29, 1934

1,960,285

UNITED STATES PATENT OFFICE 1,960,285

FISHING REEL

Samuel G. Russell, Kalamazoo, Mich., assignor to Shakespeare Company, Kalamazoo, Mich.

Application July 28, 1933, Serial No. 682,544

6 Claims. (Cl. 242—84.1)

The main objects of this invention are:

First, to provide a fishing reel having an improved crank, shaft, and gear assembly arranged so that the parts may be readily disconnected from the reel and from each other for repair and/or replacement.

Second, to provide an assembly of this character having a shaft which may be cut from square stock in an automatic screw machine.

Third, to provide a fishing reel having the above desirable features and characteristics and which is very simple and economical in its parts and very efficient in operation.

Objects relating to details and economies of my invention will appear from the description to follow. The invention is defined and pointed out in the claims.

A structure which is a preferred embodiment of my invention is illustrated in the accompanying drawing, in which:

Fig. 1 is an end elevation of a fishing reel embodying the features of my invention.

Fig. 2 is an enlarged fragmentary view in section on a line corresponding to line 2—2 of Figs. 1 and 3.

Fig. 3 is a detail section on line 3—3 of Figs. 2 and 4.

Fig. 4 is a view in side elevation of the shaft.

Fig. 5 is a fragmentary perspective view of a piece of square stock from which the shaft is produced in an automatic screw machine.

In the embodiment of my invention illustrated in the accompanying drawing, the fishing reel frame designated generally by the numeral 1 comprises an end plate 2 and a head plate 3 coacting with the end plate to provide a chambered head, the parts being arranged upon the reduced ends 4 of the pillars 5 and being retained thereon by the screws 6.

The head member is provided with an opening 8 in which the bearing 9 is secured, the inner end of the bearing being slightly spaced from the inner face of the head member. The bearing member receives the journal portion 10 of the shaft 11.

This shaft 11 is formed from a piece of square stock 12 in an automatic screw machine, the stock being turned down to provide the journal portion 10, portions of the corners being turned off at 13 to provide a gear receiving portion 14, and a square flange-like portion 15 at the inner end thereof providing supporting flanges or shoulders for the gears. The shoulder 16 at the inner end of the journal portion is spaced from the inner end of the bearing. The shaft is flattened at 17 to provide a non-circular part engaging the non-circular opening 18 in the crank 19. The outer end of the shaft is reduced and threaded at 20 to receive the clamping nut 21.

The gears 22 and 23 have central square-like openings 24 with rounded corners to fit the rounded corners of the gear receiving portion of the shaft. This permits the holes being readily punched in the gears and less accuracy is required in maintaining the punch than would otherwise be necessary. The gears are very effectively supported without the necessity for splines or keys and it is only necessary to arrange the gears upon the shaft, slip the shaft through the bearing and apply the crank to retain the parts in assembled relation.

The structure is very economical and at the same time strong, durable and efficient.

The parts of my improved assembly may be readily and inexpensively made in automatic machines. The formation of the shaft from square stock is especially advantageous for the reason that it may be completely formed in an automatic screw machine. A further advantage is that the parts may be readily assembled without upsetting portions thereof. A broken part may be readily replaced by merely removing the inner closure member from the outer end member, unscrewing the nut and drawing the shaft out of the bearing member. The gears may then be readily slipped off of the shaft for repair or replacement.

I have illustrated and described my improvements in an embodiment which I have found very practical. I have not attempted to illustrate or describe other embodiments or adaptations, as it is believed this disclosure will enable those skilled in the art to embody or adapt my improvements as may be desired.

Having thus described my invention, what I claim as new and desire to secure by Letters Patent is:

1. A fishing reel comprising in combination a frame, an end member associated with said frame and having an opening, a tubular bearing member mounted in said end member in said opening and having its inner end slightly spaced from the inner face of said end member, a shaft having a square inner end flange, a square-like inner end portion with rounded corners adjacent said flange, a round central journal portion, a non-circular outer end portion, and a threaded outer end, a pair of gears having openings fitting said square-like inner end portion with rounded corners and abutting said square inner end flange, the journal portion of said shaft being rotatably disposed within said bearing member, a crank having an opening fitting said outer non-circular portion, and a retaining nut on said threaded outer end for securing the parts in assembled relation.

2. A fishing reel comprising in combination a frame, a tubular bearing member associated with said frame, a shaft having an inner end flange, a square-like inner end portion with rounded corners adjacent said flange, a round central journal portion, a non-circular outer end portion, and a threaded outer end, a pair of gears having openings fitting said square-like inner end portion with rounded corners and abutting said flange, the journal portion of said shaft being rotatably disposed within said bearing member, a crank having an opening fitting said outer non-circular portion, and a retaining nut on said threaded outer end for securing the parts in assembled relation.

3. A fishing reel comprising in combination a tubular bearing member, a shaft having an inner end flange, a square-like inner end portion with rounded corners, a round central portion, a non-circular outer end portion, and a reduced outer end, a plurality of gears having openings fitting said square-like inner end portion with rounded corners and abutting said flange, the round central portion of the shaft being rotatably disposed within said bearing member, a crank having an opening fitting said outer non-circular portion, and means on said reduced outer end of the shaft for securing the parts in assembled relation.

4. A fishing reel comprising in combination a tubular bearing member, a shaft having a square inner end flange, a square-like inner end portion with rounded corners, a round central portion, a non-circular outer end portion, and a reduced outer end, a gear having an opening fitting said square-like inner end portion with rounded corners, the round central portion of said shaft being rotatably disposed within said bearing member, a crank having an opening fitting said outer non-circular portion, and means on said reduced outer end for securing the parts in assembled relation.

5. The combination in a fishing reel, of a frame having a chambered head provided with a bearing, a crank, a shaft formed of square stock having a cylindrical bearing portion coacting with said bearing member, a gear receiving portion at the inner end of said shaft having the corners removed, there being a square portion at the inner end of the gear receiving portion constituting gear supporting shoulders, and a non-circular crank receiving portion adjacent the outer end of said shaft, a gear arranged on said gear receiving portion, said crank being arranged on said non-circular portion, and a nut threaded upon the end of said shaft at the outside of said crank for retaining the parts in assembled relation.

6. The combination in a fishing reel, of a frame having a chambered head provided with a bearing, a crank, a shaft formed of square stock having a cylindrical bearing portion coacting with said bearing member, a gear receiving portion at the inner end of said shaft having the corners removed, there being a square portion at the inner end of the gear receiving portion constituting gear supporting shoulders, and a non-circular crank receiving portion adjacent the outer end of said shaft, a gear arranged on said gear receiving portion, said crank being arranged on said non-circular portion, and detachable means at the outside of said crank for retaining the parts in assembled relation.

SAMUEL G. RUSSELL.